June 9, 1925.  1,541,642
J. E. HALE
DEMOUNTABLE RIM CONSTRUCTION
Filed Oct. 22, 1921
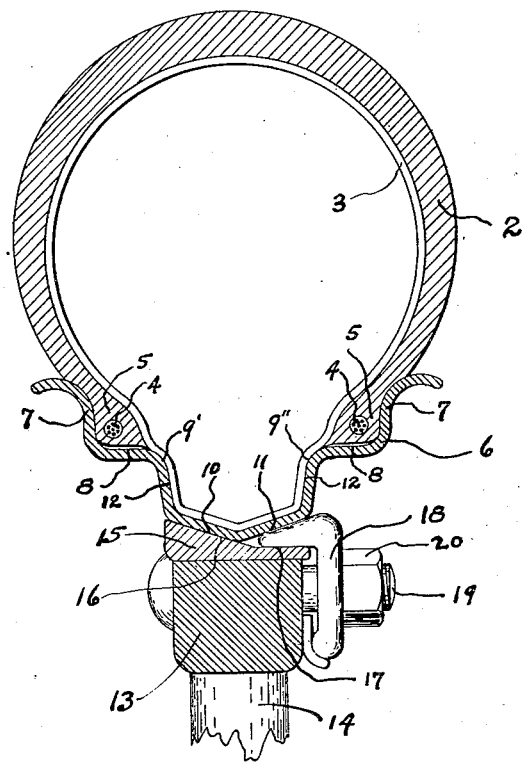
Inventor
JAMES E HALE Patented June 9, 1925.

1,541,642

UNITED STATES PATENT OFFICE.

JAMES E. HALE, OF AKRON, OHIO.

DEMOUNTABLE-RIM CONSTRUCTION.

Application filed October 22, 1921. Serial No. 509,755.

*To all whom it may concern:*

Be it known that I, JAMES ELLIS HALE, a citizen of the United States, residing at Akron, in the county of Summit and State of Ohio, have invented new and useful Improvements in Demountable-Rim Constructions, of which the following is a specification.

My invention relates to vehicle wheels fitted with pneumatic tires and demountable rims, and in particular, to those used on passenger motor vehicles of light and medium weight.

The object of my invention is to provide means whereby straight side tires, demountable rims, and rim receiving wheels may be made lighter in weight, less expensive and easier to manipulate in making tire changes. Specifically the object of my invention is to provide constructions which will adapt endless one piece drop center rims to take flexible bead straight side tires and the rim in turn to be demountable with respect to a rim receiving wheel.

In practicing my invention these objects may be attained without impairing or detracting from the essential attributes of a practical rim receiving wheel and a co-acting demountable rim. To the accomplishment of the foregoing and related ends, said invention then, consists of the means hereinafter fully described and particularly pointed out in the claim.

The annexed drawing and following description set forth in detail certain mechanism forming one specific embodiment of the invention, such disclosed means constituting, however, but one of various mechanical forms in which the principle of the invention may be used.

In said annexed drawings:—

The single figure is a radial cross section of an assembly of tire, tube, demountable rim and the peripheral portion of a rim-receiving wheel embodying the novel features under my invention.

One of the simplest, least expensive and lightest weight tire and rim combinations is to be found in a straight side tire with light flexible but inextensible beads and a one piece endless straight side rim with a "drop center" or "bead applying channel". My invention discloses practical and otherwise desirable constructions which when practised will make this form of rim readily demountable from the rim-receiving wheel. And those skilled in the art will recognize the simplicity of construction, lightness in weight and consequent cheapness as a desirable contribution to vehicle wheel developments.

Referring now to the drawing, 2 is the tire, 3 the inner tube, 4 is the inextensible bead core of the tire imbedded in the bead portion 5. The demountable rim 6 is shown to be made of one piece of uniform gauge metal, and those acquainted with the arts will understand that it is possible and desirable to fabricate a rim of this cross section in one piece from sheet steel by the conventional rim plant methods. The different portions of this rim are named as follows: 7 is the "side flange", the surface or ledge at 8 is the "bead seat", and the portion between points 9' and 9'' is the "drop center" or the "bead applying channel". 10 and 11 constitute the "inner periphery" or "inner peripheral surfaces" of the bead applying channel and as shown in Fig. 1 are co-axial frusto-conical surfaces. The sides, 12, of the bead applying channel are shown to slope slightly. The angle of this slope is not an essential feature of my invention and the exact angle used is dependent on the distance between the bead seat 8 and the width of inner peripheral surfaces 10 and 11, also somewhat influenced by the necessities of rim manufacturing practises.

It will be observed that the tire carried upon the demountable rim is of the usual or standard type and the ledges and side flanges 7 are spaced at such a distance that the standard tire retains its normal, or substantially circular cross-section. In order to accomplish this result it is desirable that the distance between the inner faces of the side flanges be less than the maximum diameter of the tire casing, and should not be greater than three-quarters of the tire diameter at its widest point.

The rim receiving wheel is composed of a wooden felloe 13, wood spokes 14 which tenon into wood felloe 13, and a metal felloe band 15 which is preferably secured to the felloe by shrinking around the wood felloe 13. The metal felloe band 15 has a peripheral surface 16 which is of frusto-conical shape and a cylindrical surface 17. The frusto-conical inner periphery 10 of the bead applying channel and the frusto-conical surface 16 of the felloe band are so designed and dimensioned that they co-act and the demountable rim 6 may thereby be mounted on the rim receiving wheel in the manner which is common among the conventional demountable rim designs in use.

In order to securely fasten the demountable rim on the rim receiving wheel, clamping means are necessary. These are shown in the clamp 18, bolt 19 and nut 20. Clamp 18 is a modification of the conventional demountable rim and wheel clamp in that the outer end terminates in a wedge shaped portion 21 which functions as a wedge between the cylindrical surface 17 of the felloe band and the frusto-conical inner periphery 11 of the bead applying channel.

It will be understood therefore, that since the demountable rim 6 is endless, and a plurality of clamps 18 suitably spaced around the wheel in a position similar to the one described, the rim will be detachably yet securely fastened to the rim receiving wheel.

The operation of removing the tire from the rim can be accomplished either when the demountable rim is in position on the rim receiving wheel or when it is demounted from the rim receiving wheel. A simple way of explaining this manipulation can be clearly set forth by assuming the rim to be in an upright position and that there be no compressed air in the inner tube. The first step would be to push the beads 5 toward each other at the uppermost portion of the rim. The bulk of the beads with relation to the bead applying channel is sufficiently small so that the beads would drop down into the bead applying channel. Naturally when this condition is brought about, the beads at the lower portion of the rim would hang down from their bead seats 8 for a distance equal to the depth of the bead applying channel. As a matter of fact, this is sufficient so that the beads at the undermost portion of the rim could be moved sidewise off the rim, clearing the side flange 7 and in that way the whole tire can be removed from the rim.

The applying of a tire to a rim is an equally simple operation; that is to say, with the tube inserted in the tire, the beads 5 would be squeezed together with the hand and with the rim in an upright position, the portion of the bead circumference would be crowded over the flange 7 and down into the bead applying channel. This would give sufficient clearance so that the beads at the opposite diameter of the rim could be slipped over the flange and be brought into position. Once the tire surrounds the rim, it is an easy matter to get the beads up on to the bead seats in position.

While I have illustrated and described my invention in considerable detail, I desire to be understood that the construction may be materially varied to accommodate changes, modifications and substitutes in vehicle wheels and in mounting devices for the rim, without departing from the scope and spirit of my invention as set forth in the appended claim.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:

A demountable tire carrying rim adapted to receive the standard inextensible bead tire, comprising an endless one-piece rim, the rim being formed with integral outwardly curved side flanges and elevated ledges adapted to receive the base of the tire beads, the rim being provided with a relatively deep channel, the side walls of which are angularly arranged with respect to the ledges, the ledges being at such a distance that the tire will be substantially circular in cross-section and the distance between the vertical inner faces of the side flanges being not greater than three-quarters of the maximum sectional diameter of the tire, the innermost surface of the channel having a seating surface by which the rim may be demountably secured to the wheel body.

JAMES E. HALE.